United States Patent [19]

Szymber

[11] 3,745,234

[45] July 10, 1973

[54] VIDEO REPRODUCTION SYSTEM FOR PHOTOGRAPHIC AND OTHER IMAGES

[75] Inventor: Oleg Szymber, Elk Grove, Ill.

[73] Assignee: GAF Corportion, New York, N.Y.

[22] Filed: July 13, 1971

[21] Appl. No.: 162,150

[52] U.S. Cl. .............................. 178/5.2 R, 178/6.8
[51] Int. Cl. .............................. H04n 9/02
[58] Field of Search ....................178/5.2 A, 5.2, 178/6.8, 5.2 D, 6, DIG. 28

[56] References Cited

UNITED STATES PATENTS

| | | | |
|---|---|---|---|
| 2,214,072 | 9/1940 | Biedgermann | 178/5.2 A |
| 2,842,610 | 7/1958 | Crosfield et al. | 178/5.2 A |
| 2,905,755 | 9/1959 | Neale | 178/5.2 A |
| 2,977,407 | 3/1961 | Hirsch | 178/5.2 A |
| 2,985,712 | 5/1961 | Mawby | 178/5.2 A |
| 3,096,394 | 7/1963 | Allen et al. | 178/5.2 A |
| 3,110,761 | 11/1963 | Allen et al. | 178/5.2 A |

*Primary Examiner*—Richard Murray
*Attorney*—Walter C. Kehm and Lawrence S. Lawrence

[57] ABSTRACT

An improved system for reproducing transparent photographic and other film images and opaque images on a television screen is provided in which the television picture tube upon which the image is displayed is utilized as a flying spot scanner for the image. The scanning spot from the tube is focused upon the image by a suitable lens. Light-sensitive means is positioned to receive such scanning light from the television tube which passes through or is reflected from the image and is responsive to the intensity of such light, which varies with the optical density or reflectance of the image, to produce electrical signals related thereto. These signals are amplified and returned via a suitable feed back circuit to the television unit to modulate the intensity of the screen illumination at any instantaneous spot in accordance with the signal intensity representing the corresponding spot on the image, and thereby reproduce the image upon the screen. This invention is adaptable to transparent and opaque image reproduction, still and motion picture reproduction, black-and-white and color reproduction and positive to positive and negative to positive reproduction, and may be readily employed in a home television entertainment system.

15 Claims, 10 Drawing Figures

INVENTOR.
Oleg Szymber
BY
Lawrence S. Lawrence
ATTORNEY

Patented July 10, 1973 3,745,234

5 Sheets-Sheet 2

INVENTOR.
Oleg Szymber

BY Lawrence S. Lawrence
ATTORNEY

Patented July 10, 1973 3,745,234

5 Sheets-Sheet 3

INVENTOR.
Oleg Szymber

BY Lawrence S. Lawrence
ATTORNEY

INVENTOR.
Oleg Szymber
BY Lawrence S. Lawrence
ATTORNEY

Patented July 10, 1973 3,745,234

5 Sheets-Sheet 5

INVENTOR.
Oleg Szymber

BY Lawrence Shaw
ATTORNEY

VIDEO REPRODUCTION SYSTEM FOR PHOTOGRAPHIC AND OTHER IMAGES

BACKGROUND OF THE INVENTION

The invention relates in general to an improved system for reproducing an image contained on a photographic or other transparency or opaque media upon a television screen for viewing.

A video picture is produced by a beam of electrons which strike phosphorescent coating material disposed on the inner face of a television tube. When hit by the electrons the phosphorescent material glows brightly to produce a visible spot. The spot is scanned across the tube in both the horizontal and vertical directions at a rapid rate in a typewriter like pattern to create the optical illusion that the entire screen is lighted. A complete scan, which is known as a raster, takes about one-thirtieth of a second. To produce an image upon the screen the intensity of the spot at any instantaneous point is modulated by adjusting the flow of electrons to produce lighter and darker areas corresponding to the lighter and darker areas of the image to be reproduced.

In present systems for televising transparent or opaque images this is accomplished by utilizing either a conventional videcon tube television camera or a device known as a flying spot scanner. The flying spot scanner emits a spot beam which corresponds in scanning speed and direction to the raster spot on the television screen. The beam is directed from the scanner through a photographic transparency to be reproduced, and is picked up by a photoelectric cell which produces an electrical signal corresponding in magnitude to the intensity of the light received. This signal is amplified and fed into the television circuit to control the intensity of the electron beam. In this manner, the brightness of the scanning raster spot at any point upon the viewing screen depends upon the optical density of the photographic transparency at a corresponding point. The modulation of the screen spot traveling at high speed thereby reproduces the image on the screen.

For this system to work properly, it is essential that the position of the spot emitted by the flying spot scanner be in complete synchronization with the raster pattern on the television screen. This requires both scan speed and scan direction synchronization. If there is but the slightest misorientation between the scanner pattern and the television screen pattern, the picture reproduced upon the screen will be distorted. To exemplify this point, consider that the flying spot scanner is orientated 90° out of phase with the television tube raster. The flying spot will commence its scan at a position which corresponds to either the upper right hand corner or the lower left hand corner of the television screen, whereas the screen raster will commence at the upper left hand corner. Accordingly, the intensity of the spot on the screen at the upper left hand corner will correspond to the intensity of the image at either the lower left hand corner or the upper right hand corner of the transparency, so that the image reproduced on the screen will be tilted on its side.

Similarly, if the speed of the scanning spot and the viewing spot are not fully synchronized, extensive image distortion will appear upon the screen. In color television this factor is even more pronounced, since three beams corresponding to red, blue, and green must be fully synchronized in both the scanner and the television tube to avoid picture and color distortion.

Because of the difficulty in maintaining the synchronization required for such systems, and because of the high cost of the necessary electronic components, those systems that have been produced are quite expensive. Accordingly, due to their high cost and complexity such systems are not practical for home entertainment systems.

SUMMARY OF THE INVENTION

In accordance with the present invention, a video reproduction system for displaying photographic and other image-bearing film transparencies and opaque images upon a television screen is provided which overcomes the difficulties attributable to prior systems. This is accomplished by eliminating the flying spot scanner along with its problems of synchronization with the television tube raster, and providing instead a feedback system in which the television tube itself serves as a spot scanner of the image to be reproduced.

As will be described in detail hereinafter, the system of the invention is quite adaptable for television reproduction of photographic or other opaque prints, images, and objects, slide transparencies and motion picures whether they be in black-and-white or color, and is equally adaptable for positive to positive, positive to negative and negative to positive reproduction.

In general, the video reproduction system of the invention comprises a television picture tube positioned to emit scanning light from its screen to an image to be reproduced, means for focusing said scanning light upon the image, light-sensitive means positioned to receive such scanning light which passes through or is reflected from the image and responsive to the intensity of such light, which varies according to the optical density or the reflectance of the image, to produce electrical signals corresponding thereto, and circuit means connecting the light-sensitive means and the television tube to modulate the intensity of the screen illumination at any instantaneous spot in accordance with the signal intensity generated by said light-sensitive means, representing the corresponding spot on the image, to reproduce the image upon the screen.

The structure and operation of the system are remarkably simple. In the case of image-bearing transparent film, a projection gate is provided to hold and/or guide the film in position to receive scanning light from the television screen. An instantaneous spot of scanned light from the screen is focused by suitable means such as an objective lens system, on a corresponding spot on the film transparency disposed in the gate. The optical density of the transparency at that spot determines the amount of light that it will pass. The light-sensitive means can be simply one or more conventional photosensitive cells responsive to light of all or particular wave lengths and adapted to produce electrical signals corresponding in current magnitude to the intensity of the light passing through the film and focused thereupon.

In general, suitable photocells or photodetectors as they are also called may be classified and grouped as follows: Photoconductors (photoresistors) of the cadmium sulfide, cadmium selenide, lead sulfide, lead selenide, and indium arsenide type; photovoltaics of the silicon and selenide type; photo-emissive detectors including phototubes and photomultipliers; and junction photodetectors including photodiodes and phototransistors of the germanium and silicon type, and photoswitches of the silicon type. Photomultipliers having high current output for low light levels and having a spectral response that includes all visible light, are preferred for the system of the invention due to their high sensitivity. Sensitivity to light of a particular wave length can be accomplished by utilizing suitably colored filters. Photocells of the above type are readily available commercially and can be selected to have the necessary characteristics for any particular system.

The electrical signal generated by a photocell is amplified and fed back through a suitable control circuit loop to the television tube. The circuit modulates the brightness of any instantaneous spot in accordance with the photoelectrically produced signals. As the screen spot scans the transparency the light and dark areas in the case of black-and-white reproduction and the colored areas in the case of color reproduction appearing on the television screen correspond in intensity either directly or inversely, depending on the particular photocell and/or circuit arrangement, to the light and dark areas of the transparency, thus reproducing the image.

Similarly, in the case of image-bearing opaque photographic or other prints a projection gate can also be provided to hold the print in position to receive scanning light from the screen. In this case, however, the photocell is disposed in a position to receive reflected scanned light from the print. The amount of light so received by the photocell depends upon the reflectance of the print which is in turn a function of the light and dark areas of the image at any instantaneous point. Thus, the signals generated by the photocell vary in accordance with the light and dark areas of the print, and thereby modulate the screen intensity to reproduce the image.

In the same manner the scanning television screen spot can be focused upon three dimensional objects and reflected thereby to and refocused upon one or more suitably positioned photocells. The current generated by the cells can be fed back to the television tube through a control circuit to reproduce the object images upon the screen.

The control circuit can be adapted to operate in either a positive or negative feedback mode. In the positive feedback mode the television tube is controlled to normally emit a minimum intensity spot and the control circuit operates to increase the screen intensity in proportion to the signals received from the photocell. It will be perceived by those skilled in the art that the positive feedback system tends to stabilize the screen illumination at either its minimum or maximum levels, with little in between, so that the reproduction of gray or half-dark image areas tend to be lost on the screen. While this is generally not acceptable for photographic or other picture reproduction, it is quite desirable for the video reproduction of high contrast images, such as printed material.

In operation, when the screen spot approaches a black or non-transparent, non-reflecting area of the image, the light reaching the photocell decreases, thereby reducing the generated current. The screen illumination intensity is likewise reduced by means of the control circuit. When the screen spot reaches the black area, the photocell generates no current, so that the screen illumination is stabilized at its minimum intensity, thus reproducing the dark area upon the screen. It should be noted that minimum intensity is not synonymous with zero intensity. Although the screen appears relatively dark at its minimum illumination level, there is always some light being emitted. It is this factor which permits rebrightening of the screen in the positive feedback system. When the darkened screen spot approaches a half-dark or gray area on the image, the light reaching the photocell is increased, since the half-dark area passes some light, whereas the black area passes none. The current generated is increased and the screen illumination is likewise increased. The increased screen illumination simultaneously increases the light striking the photocell which further increases the screen illumination, so that it rapidly reaches its maximum level and washes out the grey image, which will appear as a bright spot on the screen. Naturally, where the image consists of only light and dark areas this type of positive reproduction system is ideal.

In the negative feedback mode the screen normally emits a maximum intensity spot and the control circuit operates to attenuate the screen intensity in proportion to the signals received from the photocell. This system is capable of stabilization at any point between maximum and minimum screen intensity and is accordingly preferred for reproduction of images having a wide range of tonal characteristics. Although the term negative feedback implies that such a system reproduces positive screen images from negative subject images or vice versa, the negative feedback control circuit is also adaptable, as will be described hereinafter with reference to the drawings, to a positive to positive reproduction system. In either case the negative feedback control circuit operates to attenuate the brightness of the screen spot to produce a relatively constant current in the photocell regardless of the tonal characteristics of the subject image. Considering for the moment the positive reproduction of a negative photographic slide the operation of the system is as follows:

As the scanning screen spot approaches any instantaneous slide spot the photocell begins to generate electrical current corresponding in magnitude to the slide density. The control circuit, when energized by such current, begins to attentuate the screen spot, so that when the screen spot reaches the corresponding slide spot its illumination has been reduced to the proper intensity. If the negative slide is clear, the photocell receives the maximum amount of light from the screen and in response thereto generates a maximum signal. When this signal is fed back to the television tube, the screen brightness is reduced. This in turn reduces the photocell output current which simultaneously tends to brighten the screen. The feedback process continues until equilibrium is reached between the screen spot brightness and the photocell current. Since a clear slide produces a dark image and a dark slide produces a bright image, the amount of light reaching the photocell is approximately constant at any given time, so that the photocell maintains a relatively constant current output. Fluctuations occur when the system is readjusting itself to reach equilibrium, but this is instantaneous at any given spot. In addition, one exception to the constant current output occurs where the image is totally black, so that no light reaches the photocell. In that case the screen is illuminated to its maximum, but no current is generated.

The adaptation of the video reproduction system of the invention to transparent and opaque images, black and white, color, still and motion picures as well as negative to positive and positive to positive reproduction is further described with regard to the several embodiments shown in the accompanying drawings.

DESCRIPTION OF ILLUSTRATED EMBODIMENTS

Figure 1:
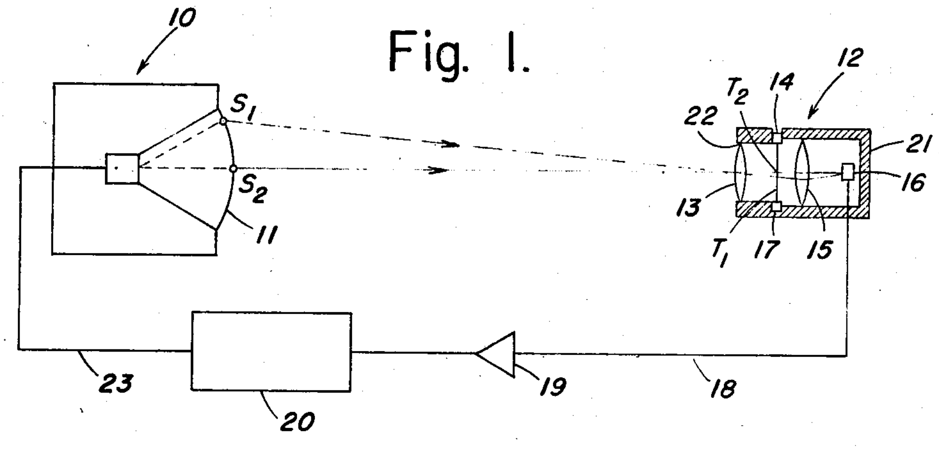
FIG. 1 is a schematic diagram of one embodiment of the invention utilizing a negative feedback circuit for negative to positive transparent image reproduction.

Referring to FIG. 1, a video reproduction system for displaying photographic transparencies on a television screen is illustrated which is adapted for negative to positive and positive to negative black-and-white still image reproduction. This is the most basic form that the invention can take.

The system utlizes a conventional black-and-white television set 10 having a cathode ray picture tube 11. An optical pick-up and feedback unit 12 adapted to hold at least one negative photographic transparency 17 receives scanning light from the raster of television tube 11 and feeds back an electrical impulse, corresponding in magnitude to the amount of light passing through the transparency 17, to the television set 10 via amplifier 19 and control circuit 20. The optical pickup and feed back unit 12 comprises a housing having a light receiving opening 22 positioned to receive light from the television tube 11 and a film gate 14 disposed transversely across opening 22 and adapted to hold photographic slide 17. An objective lens 13 disposed within opening 22 is adapted to focus the light received from the screen upon a slide disposed within film gate 14. Light-sensitive means 16 is positioned within housing 21 to receive the light which passes through slide 17. A condenser lens 15 refocuses such light upon the light-sensitive means.

The light-sensitive means 16 is of the type known as a photomultiplier which is sensitive to the intensity of the light focused upon it, and in response thereto generates an electrical signal proportional in magnitude to such light intensity. The signals generated are carried via line 18 to amplifier 19 which is of the video type having a frequency bandwidth of between about 4 to 5 Mhz. Although shown schematically in FIG. 1 as being the external of the unit 12, the amplifier 19 can also be disposed within housing 21 of the optical pick-up and feed back unit 12, if so desired.

The optical pick-up and feedback unit 12 corresponds to a conventional slide projector with the exception that it is adapted to receive light generated from an outside source, i.e., the television tube, rather than to project light upon a reflective surface. In fact, a conventional slide projector can be utilized for this purpose simply by replacing the projection bulb with a photomultiplier and its associated circuitry. In this respect it should be noted that although a simple device adapted to hold a single slide 17 is illustrated in FIG. 1, it will be apparent to those skilled in the art that a more complex projection unit adapted to receive a slide tray containing a plurality of slides and having means for indexing the slide tray and transporting a selected slide to and from the projection gate can also be utilized.

Figure 9:
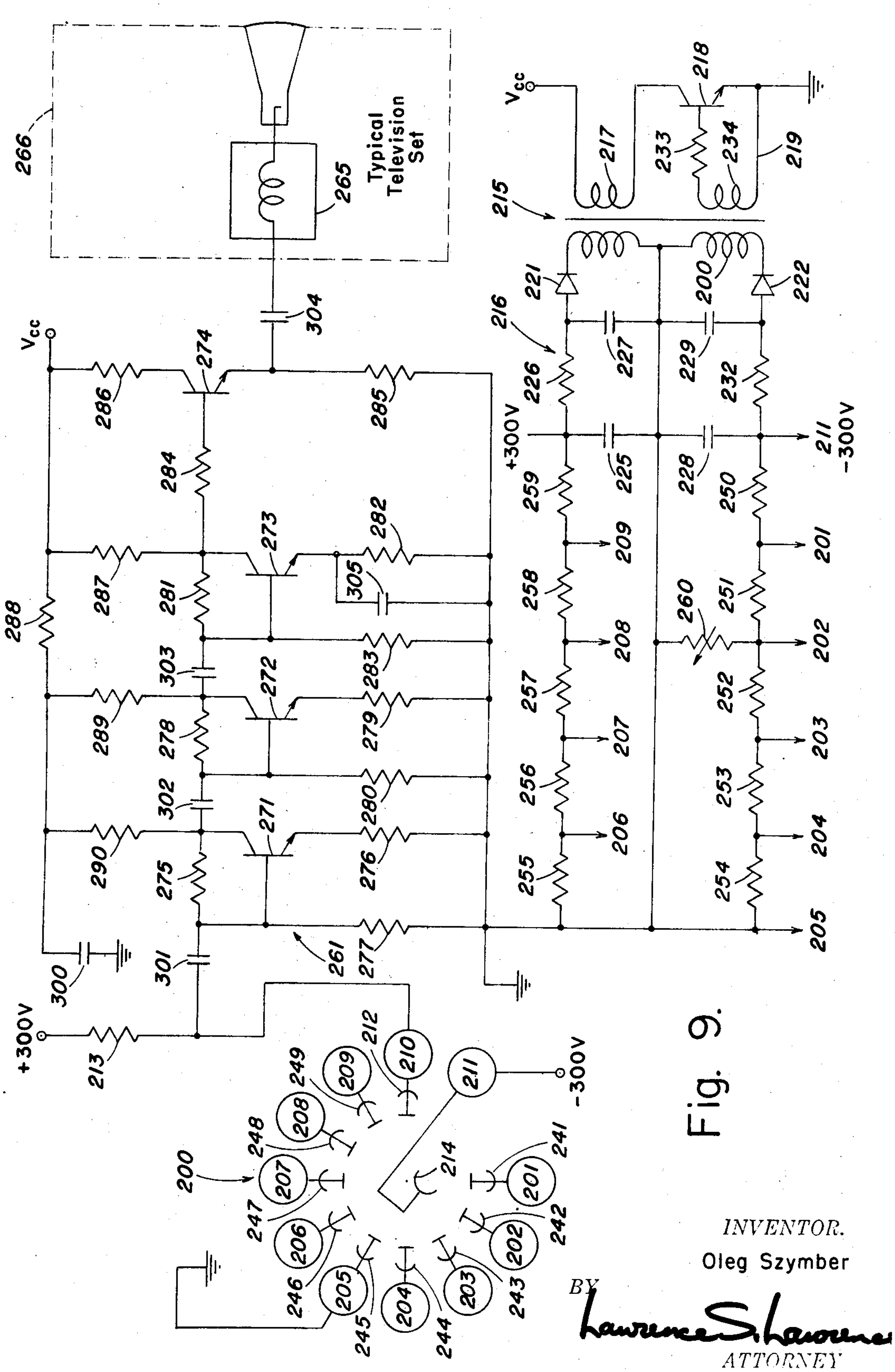
FIG. 9 is a schematic diagram of a typical negative feedback circuit for negative to positive black and white image reproduction.

The control circuit 20 is of the negative feedback type as previously described for modulating the intensity of the electron beam within the cathode ray tube at any given instant in response to the boosted signals received from light sensitive means 16. Circuit 20 is adapted to convert the amplified photoelectrically generated current into conventional video rf signals, in a manner such that line 23 extending from control circuit 20 can be simply connected to the antenna lead wires of television set 10. The rf signals operate in conjunction with the video receiving and brightness circuitry of the television set to attenuate the screen spot intensity at any instantaneous point in direct proportion to the amplified signals received from light-sensitive means 16. Thus, the stronger the signal received by control circuit 20 the darker will appear screen 11. It is this feature which reverses the brightness pattern of the image and produces a positive picture from a negative slide, and vice versa. A schematic of the photocell amplifier and negative feedback control circuits is shown in FIG. 9.

It should be noted that the rf signals produced by the control circuit can be fed into a conventional transmitter for wireless transmission to the TV antenna.

Another alternative is to eliminate the rf signal generating portion of the control circuit and feed the amplified control signals directly into brightness circuitry of the television. This by-passes most of the television circuit and simplifies the entire system. However, connection of the feedback circuit to the appropriate points of the brightness circuit requires a skilled technician, unless lead wires are drawn to an external point. Therefore, in cases where an optical pickup and feedback unit including the appropriate circuitry is provided as an accessory component to an existing television set, it is preferable to arrange the control circuit for direct connection to the television antenna leads. But, where such unit is provided in conjunction with a compatibly designed TV, such as the television entertainment system shown in FIGS. 6 and 7, the simplified circuit is preferred.

In operation, television set 10 is turned on and set to an unused channel. Note, however, that where the control signals are fed directly to the cathode tube brightness control, it is preferable to set the television on a used channel. This provides a more uniform raster, without interference, since the feedback signals cut out normal transmission. Slide 17 is inserted in the projection gate 14 of the optical pickup and feedback unit 12, and the unit 12 is aimed at the television screen. It should be noted that although the optical axis of the pickup unit 12 and the television tube 11 are shown to be coaxially disposed in FIG. 1, such positioning is not essential, so long as lens 13 is positioned so that it is capable of picking up the entire lighted area of the television screen. However, to avoid keystone distortion lens 13 and slide 17 must be disposed in planes parallel to screen 11. The flying spot scanned along the television screen is focused by lens 13 upon slide 17, and then refocused by condenser lens 15 on photocell 16. The signal generated by the photocell is proportional in intensity to the light incident upon it. When amplified and fed back into the television set via control circuit 20 the signal attenuates each instantaneous spot appearing on the screen in proportion to the light reaching photocell 16. Thus, the light areas of the slide 17 appear as dark areas on the screen, and the dark areas of slide 17 appear as light areas on the screen to reproduce a positive image from a negative slide.

This is more readily understood by example. Consider instantaneous spot S-1 on screen 11 being of normally maximum intensity. The light produced by spot S-1 is focused upon a corresponding spot T-1 on the transparency 17. If point T-1 on the slide represents a totally black or nontransparent area, no light from that spot on the slide will reach light-sensitive means 16. Accordingly, no current will be generated by cell 16 and control circuit 20 will permit continued energization of the screen spot S-1 to its maximum intensity. Now consider that the flying screen spot has reached instantaneous point S-2 and is focused upon slide 17 at point T-2. If point T-2 on slide 17 represents a point of minimum density, i.e., maximum transparency, the maximum amount of light from point S-2 on screen 11 will be focused on photocell 16, which will in turn produce a maximum intensity signal. When energized by this signal, the control circuit 20 will simultaneously attenuate the intensity of the corresponding screen spot S-2, thus darkening the screen at that spot. At that instant minimum light reaches photocell 16, the cell produces a minimum signal, and the control circuit simultaneously operates to increase the intensity of the screen spot and thereby tends to rebrighten the screen. If the screen spot is now focused upon a one-half density or gray portion of the slide 17, a corresponding current will be generated by photocell 16 and the control circuit 20 will attenuate the spot to permit the screen brightness to reach only one-half intensity, which represents an instantaneous equilibrium point between the screen light output and the photocell current output.

Figure 2:
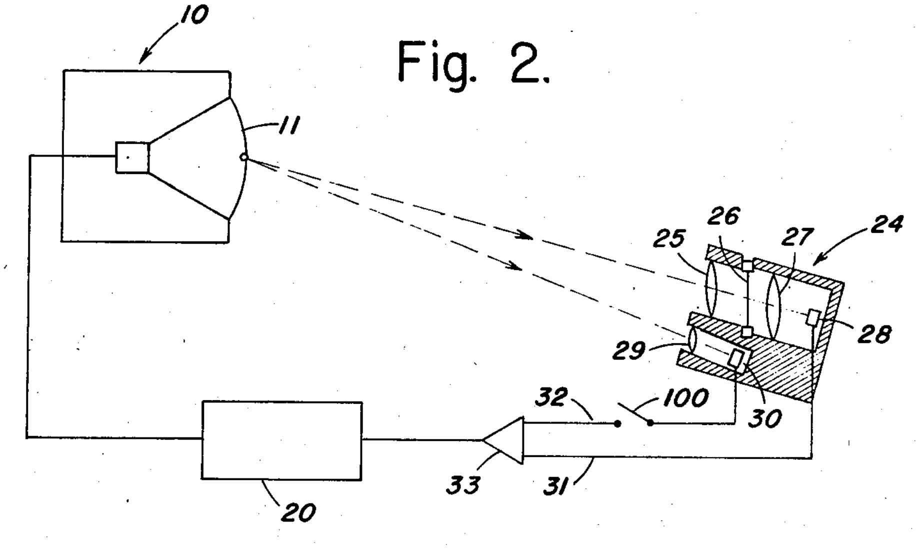
FIG. 2 is a schematic diagram of another embodiment of the invention utilizing a negative feedback circuit for positive to positive transparent image production.

The embodiment of the invention illustrated in FIG. 2 utilizes a negative feedback circuit, but permits positive image reproduction of a positive slide.

In this system, the optical pickup and feedback unit 24 comprises an objective lens 25 adapted to focus light received from screen 11 upon a slide 26, and a condenser lens 27 adapted to refocus the light passing through slide 26 upon photomultiplier 28. A second lens 29 focuses scanning light received directly from the screen, upon a second photomultiplier 30. Both photocells 28 and 30 are adapted to produce electrical signals which are proportional to the intensity to the light incident upon them, and both are connected by means of lines 31 and 32, respectively, to a differential video amplifier 33 which produces a boosted signal representing the absolute difference in current magnitude between the signals generated by cells 28 and 30. The boosted signal is fed back to television set 10 via control circuit 20 which as described with reference to the embodiment of FIG. 1 attenuates the screen intensity in proportion to the amplified signals, so that the stronger the signal reaching control circuit 20 the dimmer will appear the image upon the screen at any instantaneous point.

The operation of the system shown in FIG. 2 is as follows:

An instantaneous spot appearing on screen 11 is received by the pickup and feedback unit 24 and simultaneously focused on both photocells 28 and 30. Photocell 28 receives only that light which passes through slide 26 and is refocused upon it by condenser lens 27, whereas photocell 30 on the other hand receives unobstructed light directly from screen 11. If the spot appearing on screen 11 is of maximum intensity, photocell 30 will produce a maximum signal. If the maximum intensity spot is focused upon a corresponding black or non-transparent spot on slide 26, no light will reach photocell 28 and it will produce no current. Accordingly, the boosted differential signal from amplifier 33 will have a maximum magnitude. Control circuit 20 when energized by this maximum signal will operate to attenuate the instantaneous spot on screen 11 to its minimum intensity, thus darkening the screen to correspond to the darkened spot on slide 26. Once the screen becomes darkened, however, photocell 30 receives a minimum amount of light, and thus produces a minimum signal. Cell 28 likewise receives minimum light because of the darkened slide, and it too produces a minimum signal. At this point, the absolute difference in the signal magnitude produced by the two cells tends to be reduced. In response to the reduced signal circuit 20 operates to permit reintensification of the screen spot, thus tending to relight the screen. However, if the screen spot now strikes another high density or non-transparent area of slide 26, there will be no change in the differential signal, and the screen will remain dimmed to correspond to the optical density of slide 26.

When the scanning screen spot reaches a low density or relatively clear area of slide 26, both cells 28 and 30 will receive substantially unobstructed light from the screen, and in response thereto will generate approximately equal signals. The difference between the signals generated by cells 28 and 30 will therefore be a minimum value, little current will reach circuit 20 and it will, in response, operate to brighten the screen to its maximum intensity, thus reproducing an instantaneous spot which corresponds in intensity to the light spot on slide 26.

If the maximum intensity spot now strikes a gray or partially dark area of slide 26 the intensity of light reaching cell 28 and the current generated in response thereto can be assigned a value of one-half. Cell 30, on the other hand, continues to receive unobstructed light from the screen and will generate a maximum signal.

Thus, differential amplifier 33 will produce a boosted signal representing one-half magnitude, or the difference between the signals received from both cells. Circuit 20 will in response to such signal simultaneously operate to reduce the screen intensity at the particular spot to one-half brightness, thus corresponding to the gray area on slide 26. Thus, the system operates to produce a positive image upon screen 11 which corresponds in every detail to the positive image contained on slide transparency 26.

The system of this embodiment is also operable to reproduce positive images from negative slides. A switch 100 disposed in line 32 permits the selective disconnection of photocell 30 from the circuit. When cell 30 is disconnected, the system is identical in operation to the system of FIG. 1.

It should also be noted that as in the case of the embodiment shown in FIG. 1, the optical pickup and feedback unit 24 is merely representative of many different types of projection equipment which can be employed.

Figure 3:
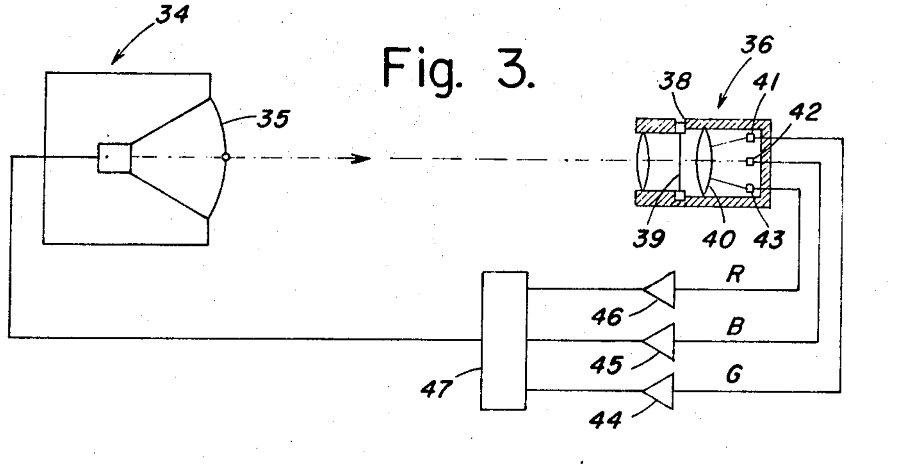
FIG. 3 is a schematic diagram of still another embodiment of the video viewing system of the invention adapted for color negative to positive transparent image reproduction.

Referring now to FIG. 3, the embodiment shown therein is adapted to reproduce upon television screen 35 a positive color image from a color negative transparency.

In this embodiment a television set designated 34 is of the color type and contains a conventional color television tube 35. An optical pickup and feedback unit 36 is provided which is similar to that shown in FIG. 1, except that it contains three light-senstive photocells 41, 42, and 43 which are responsive only to green, blue, and red light, respectively, to control the respective green, blue and red electron guns in picture tube 35. An objective lens 37 focuses scanning light received from color tube 35 upon color transparency 39 disposed within film gate 38 of the pickup and feedback unit 36. The light passing through transparency 39 is refocused simultaneously upon the cells 41, 42, and 43 by means of condenser lens 40. The signals generated by each of the three photocells correspond in magnitude to the amount of such color to which they are responsive appearing at any instantaneous point on the slide and illuminated by the scannning spot from the screen. The signals generated by cells 41, 42 and 43 are boosted by video amplifiers 44, 45 and 46 respectively and are fed back into a control circuit 47, which is of the negative feedback type and modulates the intensity of the three colors electron beams within television tube 35 in opposite proportion to the amount of that color contained on the color slide at any given instantaneous point.

For example, if slide 39 is a color negative of an all green field it will be composed of the complementary color, which is magenta. Magenta comprises the primary colors of red and blue, so that slide 39 will only pass red and blue light. Photocells 42 and 43 will therefore generate maximum signals, since they will receive all of light passing through slide 39. Cell 41 on the other hand will receive no light from the television screen and will therefore generate no signal. Since control circuit 47 operates to attenuate the particular screen color light in proportion to the signals generated from the corresponding color photocells, the intensity of the red and blue beams appearing on screen 35 will be minimized and the intensity of the green will be maximized, thus reproducing an entire green field on the screen.

Table I illustrates the operation of this device for several other colors. In observing this Table it should be noted that the combination of red, blue and green produces white light on a conventional color TV screen and that the combination of red and green produces yellow light on the screen. Also note that a color negative contains dye images which are negative with respect to the tone gradations of the original subject, and are completmentary to the colors of the subject. Thus, a bright red subject yields a dark cyan negative. The negative acts as a color filter and will pass light of only those colors from which it is composed. Table I is representative of the colors that can be produced and is in no way intended as a limitation.

Furthermore, each slide can contain discrete or overlapping areas of different or mixed colors. The flying spot on color tube 35 scans the slide 39 in the same manner as in the black-and-white embodiments described in FIGS. 1 and 2, so that the image appearing on the screen at any instananeous spot corresponds directly in position and inversely in color and brightness to that spot on the slide.

Photocells 41, 42, and 43 are of the photomultiplier type as utilized in the black-and-white system and have suitable green, blue and red color filters (not shown) associated therewith to screen undesired light. This ensures that the photocells will be energized only by light of the particular wave length corresponding to its color filter even though the photocell by itself is sensitive to all light.

As in the black-and-white system the color amplifiers 44, 45, and 46 are merely adapted to boost the current generated by the corresponding photocells. Likewise, negative feedback control circuit 47 operates in essentially the same manner as control circuit 20 in the black-and-white system described above. However, circuit 47 comprises three discrete systems, one for each color electron beam, which are operative in response to the boosted signals received from the three color photocells.

As in the case of the embodiments shown in FIGS. 1 and 2, the optical pickup and feedbak unit 36 of the color system is merely representative of many different types of pickup units that can be employed, such as conventional slide and motion picture projectors.

In addition, the optical pickup of the light appearing on screen 35 by the unit 36 need not be direct-line pickup. As described hereinafter with relation to the embodiments shown in FIGS. 6 and 7, the scanned light from the screen 35 can be reflected by a mirror to the optical pickup and feedback unit 36. Such arrangements will be apparent to those skilled in the art.

Figure 4:
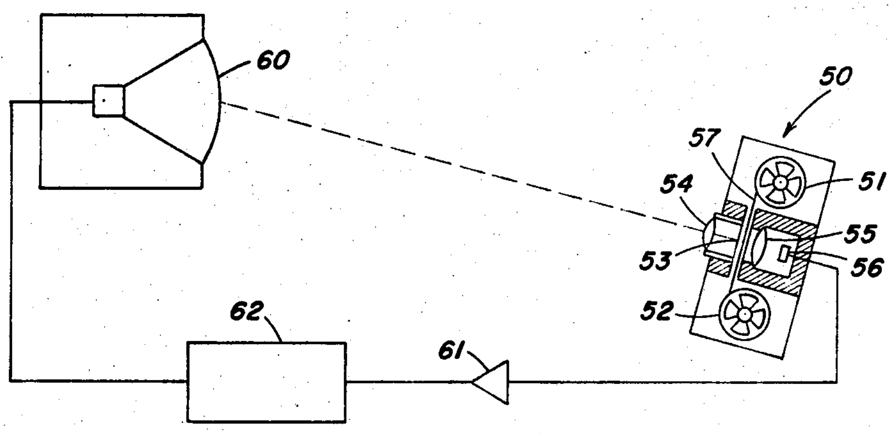
FIG. 4 is a schematic diagram of another embodiment of the invention adapted for the reproduction of motion pictures upon a television screen.

FIG. 4 illustrates the television viewing system of the invention adapted for the reproduction of motion pictures. In this embodiment an optical pickup and feedbak unit 50 is in the form of a motion picture projector having a supply reel 51, a takeup reel 52, and motor means in operative connection with said reels for transporting film 57 from the supply reel 51 to the takeup reel 52 via projection gate 53. Objective lens 54 focuses scanning light received from television screen 60 upon the particular frame of film 57 disposed within the projection gate 53 at any given instant. The light passsing through film 57 is focused by means of condenser lens 55 upon light-sensitive means 56 in the form of a photomultiplier cell. The signal generated by cell 56 is boosted by amplifier 61 and fed back into the television set to control the intensity of the image upon screen 60 by means of control circuit 62. The operation of photomultiplier 56, amplifier 61 and the control circuit 62 is the same as that described with relation to the embodiment shown in FIG. 1. In other words, the sys-

TABLE I

| Subject color | Red | Blue | Yellow | Orange | Magenta | Cyan | Black | White | Gray |
|---|---|---|---|---|---|---|---|---|---|
| Negative complementary color | Cyan (blue-green) | Yellow | Blue | Blue-cyan | Green | Red | White | Black | Gray. |
| Photocell pickup | Blue-green | Red-green | do | Blue-blue-green | do | Red | Red-blue-green | None | Red-blue-green (partially illuminated). |
| Reproduced screen color | Red | Blue | Yellow (red-green) | Orange (red-yellow) | Magenta (red-blue) | Cyan (blue-green) | Black (no color) | White (red, blue, green) | Gray (red, blue, green, partial intensity). |

tem shown in FIG. 4 is adapted to display on television screen 60 a positive image from a negative film 57 disposed in the projection gate 53.

The projector unit 50 is of course adaptable for use with the positive to positive black-and-white reproduction system illustrated in FIG. 2, the color negative to positive system illustrated in FIG. 3 as well as the positive to positive color reproduction system described hereinafter with reference to FIG. 5. The adaptation of these various systems to the embodiment shown in FIG. 4 will be apparent to those skilled in the art.

In conventional 8mm or Super 8mm motion picture projection, the film is transported through the projection gate at the rate of approximately 16 frames per second. Such movement, however, is not continuous. The film moves in incremental steps and during the instant time period when light from the projector reaches the screen, the film is stopped. In other words, the film stops and starts 16 times each second. During the movement period a shutter blocks the light from the lens and thereby prevents blurriness and flickering of the image upon the screen. What is projected is a rapid succession of 16 still pictures each second. Pulldown means, often in the form of a claw, are used to engage the film sprockets to advance the film the required distance for each frame.

In the television motion picture system of the invention as illustrated in FIG. 4, it is necessary that each film frame to be reproduced upon screen 60 be either stationary within film gate 53 or have zero relative motion with respect to each screen raster as it is being scanned by the flying spot emitted from screen 60. If the film is moving during a scan a distorted image will appear on the screen. Accordingly, the speed of the screen raster must be equal to or be some multiple of the frame speed of the film. As mentioned hereinbefore, a conventional television produces 30 rasters per second. This is approximately twice the number of frames projected in a conventional motion picture projector. Accordingly, the frame speed of the film as it is advanced through film gate 53 of pickup and feedback unit 50 is adjusted to 15 frames per second to correspond to the speed of each raster pattern upon the television screen, so that the scanned light is beamed upon only a rapid succession of still pictures. The slight reduction in frame speed does not visibily affect the optical characteristics of the televised image. Alternatively, the raster pattern speed of tube 60 can be increased to 32 per second to accomplish the same frame-raster synchronization.

In conventional motion picture projection systems it is common to interpose a movable mechanical shutter between the projection bulb and the screen to prevent screen illumination during the movement of the film from frame to frame. The same system can be utilized in the television motion picture system of FIG. 4.

An alternative shutter system is of the electronic type, and that is preferred for this embodiment. Switching means can be provided in association with circuit 62 to fully deactivate the screen illumination beam during movement of the film from frame to frame. A simple microswitch (not shown) associated with the frame pulldown claw can be adapted to alternately energize and de-energize a portion of circuit 62 for accomplishing the electronic shutter operation in synchronization with the movement of film 57. Similarly, a photocell which receives direct screen light when the film is stationary, but is shielded from the light by the pulldown claw during film advance can be electrically connected to the television circuit to intermittently deactivate the screen light. In this manner the screen is unlighted during frame advancement and lighted in accordance with the photoelectrically generated feedback signals when the film is stationary.

A still further shutter alternative is available which has the advantages of eliminating the mechanical film pulldown claw device and permitting continuous advancement of the film without intermittent stopping while each frame is televised. This is accomplished by synchronizing the film advancement speed with the raster scan speed and the raster frequency; i.e., number of rasters per second. In this manner the relative motion between the screen scan and each film frame can be controlled so that the flying spot is focused upon a relatively stationary image. The means for implementing such synchronization between film speed and television tube raster pattern speed are quite simple. A continuously driven sprocket wheel or friction wheel is provided to advance the film at a constant speed through the projection gate. The drive means for the sprocket wheel, which can be a conventional A.C. or D.C. motor is mechanically connected to a multifaced rotatable prism. The prism enables the projection of stationary images from a film advanced with a uniform speed synchronized with the rotational speed of the prism so that at all times the deviation of the beam of screen light caused by the refraction through the prism is equal with an opposite in direction to the displacement of the film so that there is no relative motion between each raster and each frame. The photoelectric pickup and feedback system operates in its normal manner since the scanning light is focused upon what appears to be nonmoving. A suitable prism synchronization system is shown in U.S. Pat. No. 3,563,643.

Figure 5:
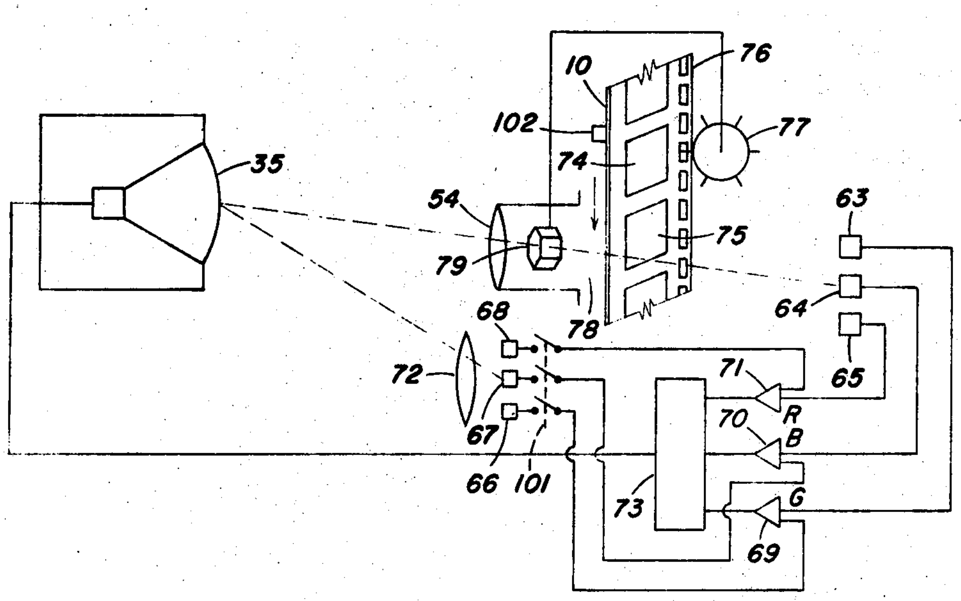
FIG. 5 is a schematic diagram of the motion picture system adapted for color positive to positive image reproduction.

This is illustrated in FIG. 5. Motor driven sprocket wheel 77 advances motion picture film 76 at a constant continuous speed through projection gate 78. The drive motor for sprocket wheel 77 (not shown) is connected and synchronized with rotatable prism 79. The prism 79 is operative to synchronize the speed of the raster pattern appearing on screen 35 with film advancement speed of each frame. Frame 75, shown in the gate 78, is scanned by the raster from screen 35. As frame 75 leaves the gate the raster scan is complete and it jumps to meet frame 74 as it moves into the gate. This is automatically repeated for each frame.

Since the film is advanced at a constant continuous speed, a magnetic sound track 101 can also be included on the film and suitable transducer pickup means 102 employed in the optical pickup and feedback device to provide accompanying sound and motion picture reproduction. Continuous movement of the sound track past the transducer eliminates sound distortion which is prevalent in many sound motion picture systems due to the incremental advancement of the film frames.

FIG. 5 also illustrates the positive to positive color video reproduction system of the invention. As in the black and white positive to positive reproduction system, the color positive to positive system includes a dual set of photosensitive signal generating cells. The first set 63, 64, and 65 which are responsive only to screen colors green, blue, and red, respectively, each receive scanning light which is focused upon film 76 by objective lens 54. The second set of cells 66, 67, and 68 also responsive only to green, blue, and red, respectively, each receive direct scanning light from television screen 35 via objective lens 72. The signals from both sets of photosensitive cells are fed into differential amplifiers 69, 70, and 71, for green, blue and red, respectively, wherein the absolute difference in current magnitude between the signals received from both sets of cells is amplified. The amplified signals are fed into negative feedback control circuit 73 which modulates the intensity of each color electron beam within television tube 35 in inverse proportion to the magnitude of amplified differential signals to reproduce a color positive image upon the screen.

The following example is illustrative of the operation of this system. Suppose that frame 75 of film 76 is a positive transparency of an all green field. Cell 63, since it is sensitive to only green light will receive light passing through frame 75 and will in turn generate a maximum signal. Cells 64 and 65 on the other hand are sensitive to only blue and red light respectively, and will generate no signals in response to the green light focused upon it. If we assume that at the startup, the instantaneous spot on screen 35 is white light, representing the glow created by appropriate intensity green, blue, and red electron beams focused upon the phosphorescent coating of the screen, then cells 66, 67 and 68 will all receive corresponding quantities of their respective colored light and will generate maximum signals. Let us first consider the signal generated in the green sensitive cell 66. The maximum signal from cell 66 combines with the maximum signal from cell 63 and is acted upon by differential amplifier 69. Since the difference between the two maximum signals is zero, control circuit 73 will operate to attenuate the green electron beam to its minimum. In other words, the intensity of the green beam upon the screen will remain at its maximum. The maximum signals from cells 67 and 68 will combine with the minimum signals from cells 64 and 65 to produce an absolute difference which represents a maximum value. This is illustrated by assigning the value of 0 to a minimum signal and the value of 1 to a maximum signal. The difference between 1 and 0 being 1, amplifiers 70 and 71 will emit a boosted maximum signal. Control circuit 73 when energized by the maximum blue and red signals will operate to attenuate the blue and red electron beams to their minimum, thus reproducing on the screen an all green field corresponding to the all green field of frame 75. Now assume that the next frame to be advanced into the projection position 74 is an all red field. At the instant frame 74 is brought into a position to be scanned by the raster of the tube 35, the flying spot of the tube is emitting an all green light. Accordingly, cells 64, 65, 67, and 68 will emit no electrical current. Likewise, cell 63 which is sensitive to green light will also emit no current because the all red frame 74 blocks the green light therefrom. Therefore, only cell 66 which receives the direct green light from screen 35 will be generating a signal. When this signal reaches amplifier 69 it will combine with a 0 signal from cell 63 to produce a maximum signal in the green portion of control circuit 73. This maximum signal will immediately attenuate the green electron beam within the television unit to reduce the illumination of that color upon the screen. Since no minimum signals are generated by amplifiers 70 and 71, control circuit 73 will operate to maximize the intensity of the blue and red beams within the television tube, thus tending to rerighten the screen. At that point, cell 66 will no longer receive light, its signal will be reduced, and control circuit 73 will operate to reintensify the green beam within the television tube, so that all three beams will tend to instantaneously become activated, and the cycle can begin again, this time producing a red image upon the screen. It should be noted, however, that equilibrium between the screen light and color output and the output of the photocells is reached during the reintensification process, so that the visible screen color and intensity at all times duplicates the slide image. A similar analogy can be made with the blue sensitive photocell or with the combination of all three colors, when the image is multicolored, or a color which represents a proportional mix of each of the three primary colors. Table II illustrates the operation of the system for various colors.

Figure 6:
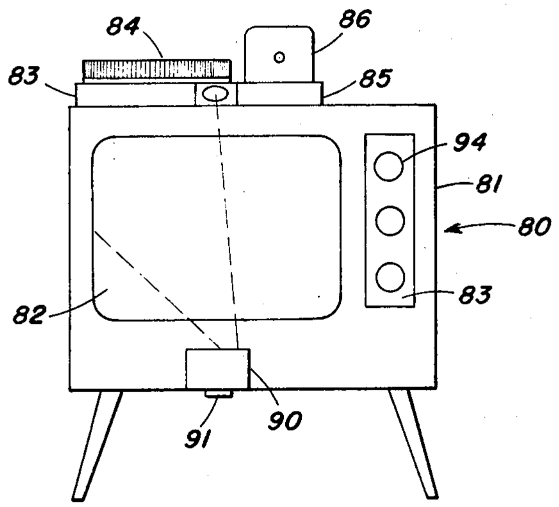
FIG. 6 is a front view of a preferred embodiment of the invention in the form of a home television entertainment system.
Figure 7:
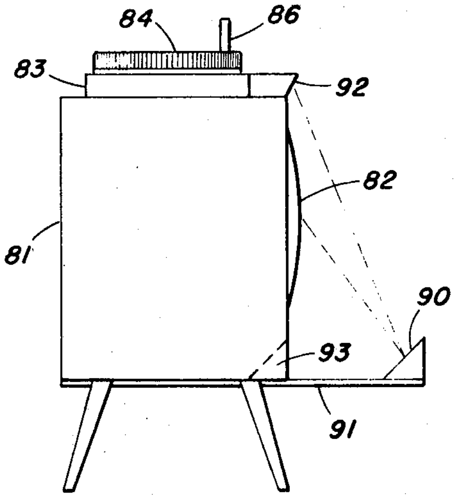
FIG. 7 is a side view of the embodiment shown in FIG. 6.

It should be noted that the positive to positive color image reproduction system shown in FIG. 5 and employed in the embodiment of FIGS. 6 and 7 is capable of operation in other than the positive to positive color mode. Switching means 101 as shown in FIG. 5 can be provided to disconnect photocells 66, 67, and 68 from the circuit. In that case only cells 63, 64, and 65 will receive scanning light from the screen, and the operating mode will be the same as the embodiment shown in FIG. 3, whereby the system will provide negative to positive color reproduction. Similarly, if a black-and-white negative is disposed in the projection gate, photocell 63, 64, and 65 will all be energized in equal amounts by the light passing through the negative. As mentioned above, when the three color beams in the color picture tube all emit at appropriate rate a white light appears on the screen. Accordingly, when energizing all three color cells by subjecting them to the same amount of light, the image reproduced on the screen will be a black-and-white image. Also, by reactivating cells 66, 67, and 68 which receive direct light from the screen and utilizing a black-and-white positive, the image contained thereon will also be televised upon the screen.

TABLE II

| Subject color | Red | Blue | Green | Yellow | Cyan | Magenta | Orange |
|---|---|---|---|---|---|---|---|
| Slide color | Red | Blue | Green | Yellow | Blue-green | Red-blue | Red-yellow. |
| Photocell pickup through slide. | Red | do | do | Red-green | do | do | Red, red-green. |
| Photocell pickup from screen. | Red-blue-green | Red-blue-green | Red-blue-green | Red-blue-green | Red-blue-green | Red-blue-green | Red-blue-green. |
| Differential signal to TV. | Blue-green | Red-green | Red-blue | Blue | Red | Green | ½ red, blue. |
| Screen color | Red | Blue | Green | Yellow (red-green). | Cyan (blue-green). | Magenta (red-blue). | Orange (½ red-green). |

The home television entertainment system shown in FIGS. 6 and 7 is a preferred embodiment of the devices illustrated in the previously described figures. The system comprises a color television unit 80 having a cabinet 81, a color picture tube 82, and a control panel 83. Mounted on the top portion of cabinet 81 is a slide presentation unit 83 having a horizontally disposed rotary slide tray 84. A motion picture presentation unit 85 adapted to receive a continuous loop motion picture film cartridge 86 is also disposed on the top of cabinet 81.

An angularly disposed mirror 90 mounted on a slidable bracket 91 is disposed in an extended position at the lower front portion of cabinet 81. In the extended position as shown in FIG. 7, mirror 90 is adapted to reflect the scanning light emitted from screen 82 toward an optical pickup lens 92 mounted above the television screen at the top of cabinet 81. A niche 93 is provided in the lower front portion of cabinet 81 to receive mirror 90 when it is not in use. The screen light reflected by mirror 90 and picked up by lens 92 is focused by means of additional mirrors and lenses (not shown) upon a film transparency disposed in a projection gate within cabinet 81. The light passing through the transparency is picked up by a series of photoelectric cells and fed back into the picture tube via a reproduction system, such as that shown in FIG. 5 for positive to positive color reproduction.

It is preferable to utilize separate projection gates for the slides contained in slide tray 84 and for the continuous loop motion picture film contained in cartridge 86. A mechanical linkage between a select knob and the appropriate lens and mirror system can be provided to switch the reproduction system from the slide mode to the motion picture mode. It should be noted that although a horizontally disposed slide tray unit is shown, other types of slide projection units such as those adapted to receive a vertical or box tray or those of the stack loading type or any other slide system can be employed in the home television entertainment system. Likewise, this embodiment is described with reference to a continuous loop motion picture film cartridge 86. The motion picture system associated with this unit can be the reel to reel type in which both reels are contained in a single cassette or wherein one reel is contained in a cartridge and the second reel is disposed within the television unit. Such arrangements will be apparent to those skilled in the art. In addition, any of the film advancement means described with relation to FIGS. 4 and 5 can be employed in the embodiment shown in FIGS. 6 and 7.

In operation, the desired mode of operation is selected by utilizing a control knob 94. Positions are provided for normal television broadcasting, slide transparency reproduction and motion picture transparency reproduction. Further positions can be provided for positive to positive or negative to positive reproduction. Mirror 90 is then withdrawn from niche 93 to the reflect position as shown in FIG. 7, and the television unit is turned on. If the motion picture mode was selected, the film cartridge 86 will be transported through projection gate in the manner described above with relation to FIGS. 4 and 5, and the image contained on that film will be reproduced upon screen 82. It should be noted that suitable audio pickup means can be provided so that a sound track can be included on the film contained in cartridge 86. If the slide transparency mode is selected, then the slides contained in tray 84 are sequentially advanced to the projection gate, transported from the tray into the projection gate whereupon the images contained thereon are reproduced upon screen 82. Suitable slide changing means can be provided to return the slide to tray 84 and advance tray 84 to the next position.

Figure 8:
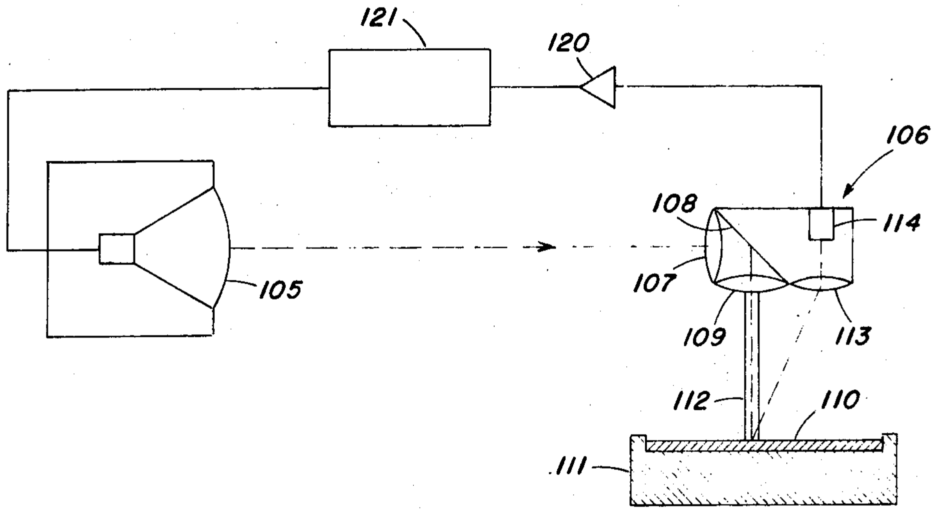
FIG. 8 is a schematic diagram of another embodiment of the invention utilizing a positive feedback circuit for positive to positive opaque image reproduction.

FIG. 8 illustrates the video reproduction system of the invention utilizing a positive feedback circuit adapted for use with an overhead projection unit. The system comprises a television tube 105 which emits scanning light to an optical pickup and feedback unit 106. The unit 106 comprises a mirror 108, a receiving lens 107 for focusing the screen light upon mirror 108, and an objective lens 109 for refocusing the light reflected from mirror 108 upon an opaque image 110 disposed in holder 111. Leg 112 holds the optical pickup and feedback unit 106 in a raised spaced apart position with respect to the opaque image 110 and permits vertical adjustment for achieving proper focus. A third lens 113 receives the scanning light reflected from the opaque image 110 and focuses such light upon photomultiplier 114 which generates an electrical signal in response to and proportional in magnitude to the light focused upon it. Such signals are boosted by video amplifier 120 and fed back to the television tube 105 via positive feedback control circuit 121. Circuit 121 operates to increase the screen illumination intensity in direct proportion to the magnitude of the boosted photoelectrically generated current received from amplifier 120.

In operation, an instantaneous spot of scanned light from screen 105 is focused upon opaque image 110 by means of lenses 107 and 109 and mirror 108. When the scanning spot reaches a white or light area of the opaque image 110 a maximum amount of light is reflected from the surface of image 110 and is refocused by lens 113 upon photocell 114. The signal is amplified and when returned to television tube 105 by the control circuit 121 operates to increase the screen intensity, thus tending to reproduce the light spot of the image upon the screen. If a black or low reflecting area of image 110 is scanned by the spot from screen 105, little light is reflected thereby, and photocell 114 produces little or no signal. The control current reaching 105 is thereby reduced, and the screen intensity is correspondingly reduced to reproduce the darkened image upon the screen. As described hereinbefore, gray areas tend to be washed out in a positive feedback system and appear on the screen as bright spots. Thus this system is quite suitable for reproducing high contrast images, such as printed material, but is less suitable for reproducing images containing tonal variations ranging from light to dark.

Figure 10:
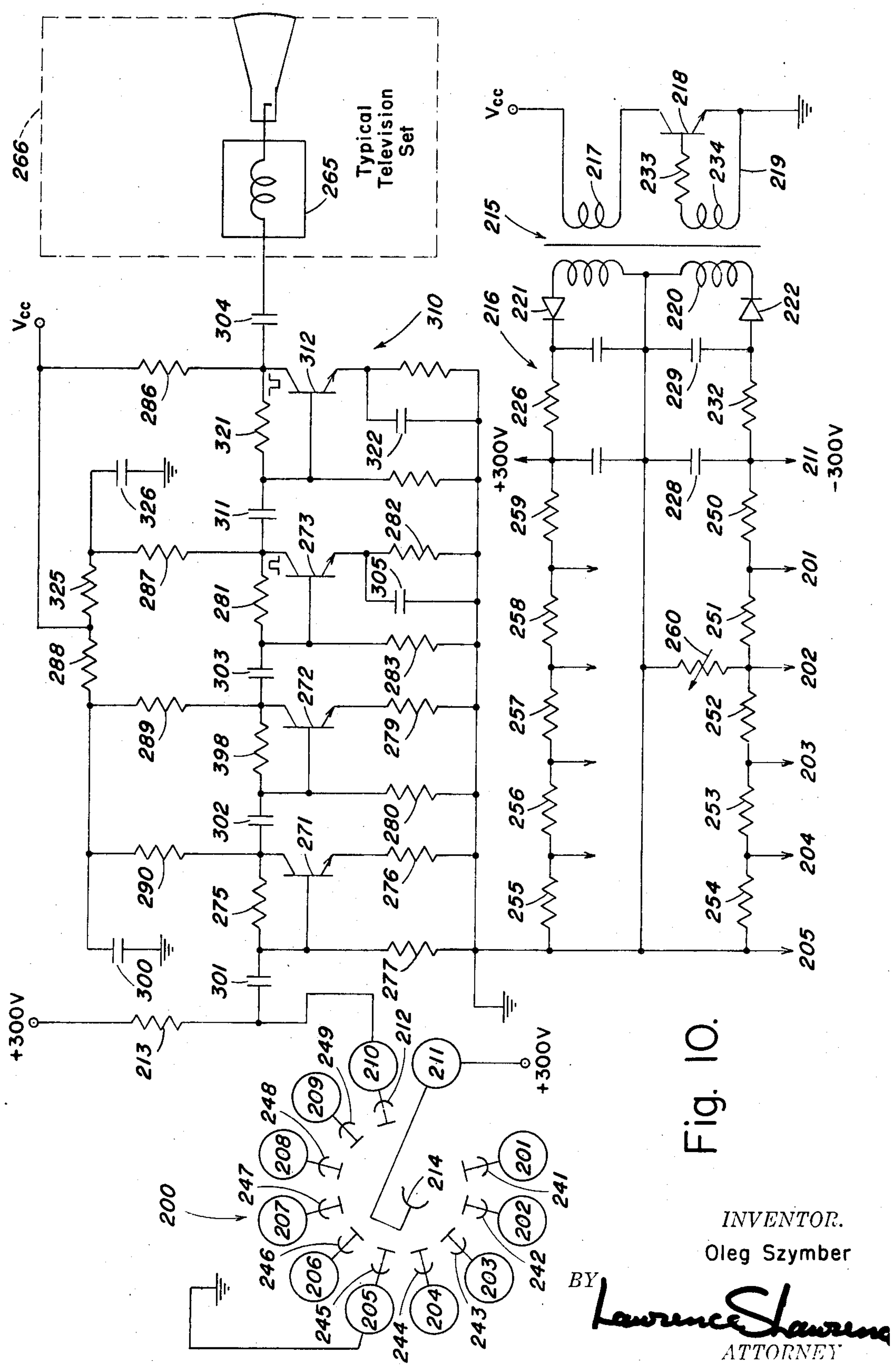
FIG. 10 is a schematic diagram of a typical positive feedback circuit for positive to positive black and white image reproduction.

FIGS. 9 and 10 illustrate typical control circuits for black and white video reproduction systems in accordance with the invention. The negative feedback circuit shown in FIG. 9 is of the type that can be utilized in the embodiment of the invention shown in FIG. 1. Photomultiplier 200 has an anode 212 connected to a positive source of 300 volts through pin 210 and resistor 213, and cathode 214 connected via pin 211 to a negative source of 300 volts. Both the positive and negative voltage sources are derived from power supply Vcc via step-up transformer 215 and associated voltage divider 216.

Transformer 215 comprises a primary coil 217 connected at one end to the power supply Vcc and at the other end to the collector of NPN transistor 218, and a center tap secondary coil 220. The secondary coil 220 is connected at the top to the anode of a diode 221, at the bottom to the cathode of a diode 222, and at the center tap to ground.

The voltage divider circuit 216 comprises diodes 221 and 222, filter capacitor 227 connected on one side to the cathode of diode 221 and on the other side to ground, filter capacitor 229 connected on one side to the anode of diode 222 and at the other side to ground, filter resistor 226 linking the cathode of diode 221 and one side of another filter capacitor 225, and filter resistor 232 connecting the anode of diode 222 and one side of still another filter capacitor 228. The opposite sides of capacitors 225 and 228 are connected to ground.

An oscillator circuit 219 comprises NPN transistor 218 and feedback coil 234 connected at one end to the base of transistor 218 via resistor 233 and at the other end to the emitter of transistor 218 and to ground. When energized, initial current in coil 217 induces EMF in feedback coil 234 which saturates the base of transistor 218 to produce maximum AC current flow in transistor 218. As a result, diode 221 receives positive half cycle pulses from secondary coil 220 which charge capacitors 227 and 225 to provide a positive potential of 300 v. Similarly, diode 222 receives negative half cycle pulses which charge capacitors 229 and 228 to provide a negative potential of 300 v. Capacitors 225 and 228 tend to keep the voltage at the anode and cathode of photomultiplier 200 relatively constant.

Photomultiplier 200 has nine dynodes 241 to 249 and corresponding pins 201 to 209, which are connected to the corresponding points on the voltage dividing network comprising resistors 251 to 258. Additional resistors 250 and 259 are disposed between pins of dynode 241 and cathode 214 and dynode 249 and anode 210, respectively. The resistors serve to divide the voltage in approximately equal increments from −300 volts at the cathode to +300 volts at the anode. In this manner, dynode 245 has zero potential and is connected to ground. A potentiometer 260 is provided to redistribute the voltage across the dynodes of the photomultiplier to ensure a uniform voltage drop.

When cathode 214 receives scanning light from a television screen, free electrons are emitted which accelerate toward dynode 241. The electrons striking dynode 241 knock out additional electrons which strike dynode 242 and again increase the number of electrons. This continues from dynode to dynode until the electrons are received by anode 212, and thus produce a current flow through resistor 213 and a corresponding voltage drop thereacross. Signals so generated are amplified and fed via transistor circuit 261 to the brightness control circuit 265 of television set 266, in a manner such that the intensity of the screen illumination at any instananeous point is attenuated in proportion to the signal generated by photomultiplier 200.

Circuit 261 comprises a series of NPN transistors 271 to 274 and associated biasing resistor networks. A resistor 276 connects the emitter of transistor 271 to ground, a resistor 277 connects the base of transistor 271 to ground, and a resistor 275 connects the base to the emitter of transistor 271. The base of transistor 271 is also linked to the anode 212 of photomultiplier 200 by means of a capacitor 301 and its emitter is connected by means of resistor 290 and 288 to the voltage source Vcc.

Similarly, a resistor 279 connects the emitter of transistor 272 to ground, a resistor 280 connects the base of transistor 272 to ground, and a resistor 278 connects the base and collector of transistor 272. Capacitor 302 connects the base of transistor 272 to the collector of transistor 271. The collector of transistor 272 is connected to voltage supply Vcc via resistor 289, and the left side of capacitor 303.

In the same manner, a resistor 282 connects the emitter of transistor 273 to ground, a resistor 283 connects the base of transistor 273 to ground, and a resistor 281 connects the base and collector of transistor 273. In addition, the base of transistor 273 is connected to the right side of coupling capacitor 303, and the collector of transistor 273 is connected to the voltage source Vcc via a resistor 287. The collector of transistor 273 is also connected to the base of transistor 274, via resistor 284. A frequency compensation AC by-pass capacitor 305 in parallel with resistor 282 is provided to increase the amplification of current in transistor 273. Resistor 285 connects the emitter of transistor 274 to ground, while the collector of transistor 274 is connected to the voltage source Vcc by means of resistor 286. The emitter of transistor 274 is also connected to the brightness control circuit 265 of the television set 266 via capacitor 304.

When the power is turned on initially, positive voltage from Vcc appears at the collector of each transistor 271 to 274. To prevent voltage oscillation a decoupling network comprising resistor 288 and capacitor 300 are provided. For illustration consider merely transistor 271. The voltage at the collector is relatively high so that it causes a relatively high current in the base of transistor 271 through resistor 275. This turns on the transistors 271 to increase the current in the collector circuit which in turn causes an increase in the voltage drop across resistor 290. The voltage at the collector of transistor 271 is thereby reduced with respect to ground, the base current is reduced and the collector current is likewise reduced. Resistor 275 controls the current flow so that the voltage at the collector of transistor 271 is approximately one-half Vcc at equilibrium.

When the television screen is dark no light is received by photomultiplier 200 and no current flows through resistor 213. Accordingly, there is a positive potential of 300 v. at terminal 10 with reference to ground. When light strikes photomultiplier 200 as heretofore described, current flows through resistor 213 creating a voltage drop thereacross, so that the top of resistor 213 is positive and the bottom is less positive with respect to ground. Upon the generation of a pulse, the left side of capacitor 301 is reduced in voltage which in turn causes a corresponding voltage reduction in the right side. This produces a negative voltage change at the base of transistor 271 which reduces the current in the collector circuit and likewise reduces the voltage drop across resistor 290. This results in an increase in the voltage across capacitor 302, and a corresponding increase in the base voltage of transistor 272. This boosts the collector current in transistor 272, and accordingly increases the voltage drop across resistor 289. The voltage increase is transmitted to the base of transistor 273 via capacitor 303 and thereby reduces the collector current in that transistor. The voltage drop across resistor 287 is likewise reduced, thereby increasing the voltage at the collector of transistor 273.

Prior to a pulse, steady state voltage at the collector of transistor 273 is applied to the base of transistor 274 through resistor 284. The voltage drop across resistor 284 is small so that the voltages at the base and emitter of transistor 274 are approximately equal to the collector voltage in transistor 273. Therefore, there is normally some current flow through, and a corresponding voltage drop across resistor 285. When a pulse is applied corresponding to a low density area of the transparency, the voltage at the collector of transistor 273 and at the base of transistor 274 is increased. The emitter and collector current in transistor 274 is likewise increased, thereby boosting the voltage drop across resistor 285. This in turn results in an increase in the voltage applied to the cathode of the picture tube across capacitor 304 with reference to the control grid. Electron emission is thereby decreased and less light appears on the screen to produce a positive image from a negative slide.

It will be apparent to those skilled in the art that the above circuit can also operate as a positive feedback circuit by connecting capacitor 304 to the control grid of the TV tube. Increased voltage applied to the grid in response to a photo generated signal permits an increase electron flow which tends to brighten the screen.

The positive feedback system in FIG. 10 is essentially the same as the negative feedback system described above, the exceptions being that the decoupling network also includes resistor 325 and capacitor 326 and that transistor 274 and the associated biasing network is replaced with transistor circuit 310, which is connected to the collector of transistor 273 via capacitor 311. Circuit 310 comprises NPN transistor 312 and a biasing network of a resistor 313 connecting the emitter of transistor 312 to ground, a resistor 320 connecting the base of transistor 312 to ground, and a resistor 321 connecting the base and the collector of transistor 312. A frequency compensation AC bypass capacitor 322 is in parallel with resistor 313 and serves to increase the amplification of current in transistor 312. When a light pulse corresponding to a low density area of the transparency is received, as in the negative feedback system, the voltage in the collector circuit of transistor 273 increases. This is transmitted via capacitor 311 to the base of transistor 312, so that the current in the collector of 312 increases. This increases the voltage drop across resistor 286, and thereby reduces the voltage at the left side of capacitor 304. The right side voltage of capacitor 304 is correspondingly reduced so that a reduced voltage is applied to the cathode of the television tube and thereby increases the electron emission within the tube to brighten the screen in accordance with the intensity of the signal received.

It will be understood that the embodiments described herein are intended for illustration and not limitation of the invention. Other systems and devices utilizing a television screen feedback loop to reproduce photographic or other images will be apparent to these skilled in the art. For example, the system can be adapted for use at television transmitting studios for televising motion pictures. This is particularly useful in the case of closed circuit or cable T.V. The invention can also be adapted for use in a television-telephone communications system, in which the object images reproduced are those of the communicators.

What is claimed is:

1. A video reproduction system for displaying photographic and other images on a television screen comprising:

a television picture tube positioned and adapted to emit scanning light of minimum intensity from its screen to an image to be reproduced;

means to focus said scanning light upon the image;

light-sensitive means positioned to receive such scanning light which contacts the image representing the tonal density of the image at any instantaneous scanned spot, and responsive to the intensity of such light to produce electrical signals corresponding in magnitude thereto; and circuit means connecting said light-sensitive means and the television tube to increase the intensity of the screen illumination at the corresponding instantaneous screen spot in proportion to the signal intensity generated by said light-sensitive means to reproduce a positive image upon the television screen.

2. A system according to claim 1 further comprising means for receiving a slide magazine; means for indexing said slide magazine to advance any desired slide into position for viewing; and slide changing means to transport said selected slide between the slide magazine and the film gate.

3. A system according to claim 1, further comprising a film gate; means for receiving a supply of motion picture film; means for advancing said motion picture film through the film gate to reproduce the image contained on each frame thereof on the television screen; and shutter means to prevent screen illumination during movement of said motion picture film.

4. A system according to claim 1, in which the light-sensitive means is positioned to receive scanning light reflected from the image.

5. A video reproduction system for displaying on a television picture tube positive images from positive photographic or other film transparencies comprising:

a film gate positioned to receive scanning light from the television tube upon which the image is to be reproduced;

means to focus said scanning light upon positive image-bearing transparent film disposed within the gate;

first light-sensitive means positioned to receive such scanning light which passes through the film transparency, representing the optical density of the transparency at any instantaneous spot, and responsive to the intensity of such light to produce electrical signals corresponding in magnitude thereto; second light-sensitive means positioned to receive scanning light directly from the television tube and responsive to the intensity of such light to produce electrical signals corresponding in magnitude thereto;

a differential amplifier connected to said first and second light-sensitive means to provide a boosted signal representing the difference in magnitude between the signals received from said first and second light-sensitive means; and circuit means connecting said differential amplifier and the television tube to attenuate the intensity of the screen illumination at the corresponding instantaneous screen spot in accordance with the magnitude of the boosted differential signal received from said differential amplifier to reproduce the positive image upon the television screen.

6. A system according to claim 5 further comprising means to alternatively reproduce positive images from either positive or negative film transparencies, said means comprising:

switching means linking said second light-sensitive means and said differential amplifier and permitting selective connection and disconnection thereof in first and second positions respectively; said system being adapted to reproduce a positive image of a positive transparency in the first switch position, and a positive image of a negative transparency in the second switch position.

7. A video system for displaying positive color reproductions of positive color photographic or other positive color images on a color television picture tube comprising:

means for holding positive color image-bearing media positioned to receive scanning light comprising red, blue and green components from the color television tube upon which the image is to be reproduced;

means for focusing said scanning light upon positive color image-bearing media disposed in the holding means;

a first set of light-sensitive means positioned to receive such light which contacts the image, representing the tonal density and color hue of the image at any instantaneous spot, and having red, blue, and green light-sensitive cells responsive to such color light to generate electrical signals corresponding in magnitude to the respective red, blue and green light intensities, a second set of light-sensitive means positioned to receive direct scanning light from the television screen and having red, blue and green light-sensitive cells responsive to such color light to generate electrical signals corresponding in magnitude to the respective red, blue and green light intensity;

first, second and third differential amplifiers connected to the red, blue and green light-sensitive cells respectively, of both first and second sets of light-sensitive means to provide boosted signals representing the difference in magnitude between the signals received from said red, blue and green cells; and circuit means connecting said first, second and third differential amplifiers and the color television tube to attenuate the intensity of the red, blue and green light, respectively, illuminating the screen at the corresponding instantaneous screen spot in accordance with the magnitude of the boosted differential signals received from said three differential amplifiers to reproduce the positive color image upon the television screen.

8. A system according to claim 7 further comprising means to alternatively reproduce positive color images from either positive or negative color image-bearing media, said means comprising:

switching means linking said red, blue and green cells of the second set of light-sensitive means and said first, second and third differential amplifiers and permitting selective connection and disconnection thereof in first and second positions, respectively;

said system being adapted to reproduce a positive color image of a positive color image in the first switch position, and a positive color image of a negative color image in the second switch position.

9. A system according to claim 7 further comprising means for receiving a slide magazine; means for indexing said slide magazine to advance any desired slide into position for viewing; and slide changing means to transport said selected slide between the slide magazine and the film gate.

10. A system according to claim 7, further comprising means for receiving a supply of motion picture film; means for advancing said motion picture film through the film gate to reproduce the image contained on each frame thereof on the television screen; and shutter means to prevent screen illumination during movement of said motion picture film.

11. A television entertainment system adapted for conventional black-and-white and color reception, and video reproduction of photographic black-and-white and color film transparencies comprising:

a color television unit;

means for alternatively selecting a conventional T.V. reception mode and a video reproduction mode;

a film gate positioned to receive scanning light from the screen of the color television unit;

means for focusing said scanning light upon image-bearing transparent film disposed within the gate;

a first set of light-sensitive means positioned to receive such light which passes through the film, representing the tonal density and color hue of the image at any instantaneous spot, and having red, blue, and green light-sensitive cells responsive to such color light to generate electrical signals corresponding in magnitude to the respective red, blue and green light intensities, a second set of light-sensitive means positioned to receive direct scanning light from the television screen and having red, blue and green light-sensitive cells responsive to such color light to generate electrical signals corresponding in magnitude to the respective red, blue and green light intensity;

first, second and third differential amplifiers connected to the red, blue and green light-sensitive cells respectively, of both first and second sets of light-sensitive means to provide boosted signals representing the difference in magnitude between the signals received from said red, blue and green cells; and circuit means connecting said first, second and third differential amplifiers and the color television tube to attenuate the intensity of the red, blue and green light, respectively, illuminating the screen at the corresponding instantaneous screen spot in accordance with the magnitude of the boosted differential signals received from said three differential amplifiers to reproduce the positive color image upon the television screen.

12. A system according to claim 11 further comprising means for receiving a slide magazine; means for indexing said slide magazine to advance any desired slide into position for viewing; and slide changing means to transport said selected slide between the slide magazine and the film gate.

13. A system according to claim 11 further comprising means for receiving a supply of motion picture film; means for advancing said motion picture film through the film gate to reproduce the image contained on each frame thereof on the television screen; and shutter means to prevent screen illumination during movement of said motion picture film.

14. A method for reproducing on a television screen positive images from positive photographic or other film transparencies comprising the steps of:

scanning image-bearing transparent film with screen light emitted from a television picture tube;

receiving such scanning light which passes through the film and represents the optical density of the transparency at any instantaneous spot upon first light-sensitive means;

receiving unobstructed scanning screen light emitted from the television picture tube upon second light-sensitive means;

generating first electrical signals in response to the intensity of light received by said first light-sensitive means;

generating second electrical signals in response to the intensity of light received by said second light-sensitive means;

producing a differential signal representing the difference in magnitude between said first and second signals;

feeding said differential signal back to the television picture tube; and attenuating the intensity of the television tube illumination at the corresponding instantaneous screen spot in accordance with the magnitude of the differential signal to reproduce the positive image upon the television screen.

15. A method for reproducing positive color images from positive photographic or other color film transparencies on a color television screen comprising the steps of:

scanning color image-bearing transparent film with screen light comprising red, blue and green components emitted from a color television picture tube;

receiving such scanning light which passes through the image, representing its tonal density and color hue at any instantaneous spot, upon a first set of light-sensitive means having red, blue and green light-sensitive cells responsive to red, blue and green light, respectively;

receiving unobstructed scanning screen light comprising red, blue and green components emitted from the color television tube, upon a second set of light-sensitive means having red, blue and green light-sensitive cells responsive to red, blue and green light, respectively;

generating a first series of electrical signals in response to the intensity of red, blue and green light respectively received by said red, blue and green cells of said first set of light-sensitive means;

generating a second series of electrical signals in response to the intensity of red, blue and green light respectively received by said red, blue and green cells of said second set of light-sensitive means;

producing red, blue and green differential signals representing the difference in magnitude between the respective signals generated by red, blue and green cells of the first and second sets of light-sensitive means;

feeding said red, blue and green differential signals back to the color television picture tube; and attenuating the intensity of the red, blue and green light illuminating the screen at the corresponding instantaneous screen spot in accordance with the magnitude of the respective red, blue and green differential signals to reproduce a positive color image upon the television screen.

* * * * *